(12) United States Patent
Barbieri

(10) Patent No.: US 8,947,268 B2
(45) Date of Patent: Feb. 3, 2015

(54) STEPPED INSTRUMENT PANEL FOR AIRCRAFT

(75) Inventor: André Barbieri, Sausset les Pins (FR)

(73) Assignee: Airbus Helicopters, Marignane Cedex (FR)

( * ) Notice: Subject to any disclaimer, the term of this patent is extended or adjusted under 35 U.S.C. 154(b) by 381 days.

(21) Appl. No.: 13/239,468

(22) Filed: Sep. 22, 2011

(65) Prior Publication Data

US 2012/0075120 A1   Mar. 29, 2012

(30) Foreign Application Priority Data

Sep. 28, 2010   (FR) ...................................... 10 03835

(51) Int. Cl.
*G08B 21/00* (2006.01)
*B64D 43/00* (2006.01)

(52) U.S. Cl.
CPC ...................................... *B64D 43/00* (2013.01)
USPC ........................... 340/971; 340/945; 248/27.1

(58) Field of Classification Search
CPC ... G06F 1/1616; G06F 1/1601; G06F 1/1656; G01C 23/00; G01C 23/005; G08G 5/0021; G08G 5/0013; B64D 45/0015; B64D 43/00; B64D 45/00
USPC .................. 340/945, 946, 971; 361/807, 809, 361/679.01, 679.06, 679.21; 244/117 R, 244/129.1; 701/1, 3, 14; 269/70; 108/44, 108/45; 248/27.1
See application file for complete search history.

(56) References Cited

U.S. PATENT DOCUMENTS

| | | | |
|---|---|---|---|
| 3,572,615 A | 3/1971 | Firestone | |
| 3,946,827 A | 3/1976 | Cadiou | |
| 7,243,882 B2 * | 7/2007 | Day et al. ..................... | 248/27.1 |
| 7,307,549 B2 | 12/2007 | Firra | |

(Continued)

FOREIGN PATENT DOCUMENTS

| | | |
|---|---|---|
| CA | 2380708 A1 | 10/2003 |
| DE | 4005605 A1 | 8/1991 |

(Continued)

OTHER PUBLICATIONS

Search Report and Written Opinion; Application No. FR 1003835; dated May 17, 2011.

*Primary Examiner* — Brian Zimmerman
*Assistant Examiner* — Laura Nguyen
(74) *Attorney, Agent, or Firm* — Brooks Kushman P.C.

(57) ABSTRACT

An instrument panel for a rotorcraft having two pilot seats, said instrument panel being arranged under an anti-glare shield (4) and including display means (2), at least some of the display means (2) being suitable for acting as communications means, said display means (2) comprising a first set (5) of display means (2) arranged on the instrument panel, and a second set (6) of display means (2) arranged on the instrument panel, wherein the instrument panel includes, symmetrically relative to a longitudinal axis, a central dashboard (3), and at least two lateral dashboards arranged on either side of the central dashboard (3), the dashboards being mutually parallel and presenting a forward longitudinal offset from one dashboard to the next starting from the central dashboard (3).

18 Claims, 2 Drawing Sheets

(56) References Cited

U.S. PATENT DOCUMENTS

| | | |
|---|---|---|
| 7,425,891 B2 | 9/2008 | Colburn |
| 2006/0075934 A1* | 4/2006 | Ram .............................. 108/44 |
| 2007/0008188 A1 | 1/2007 | Firra |
| 2007/0198141 A1 | 8/2007 | Moore |
| 2009/0128366 A1* | 5/2009 | Firra ............................. 340/974 |
| 2010/0084886 A1* | 4/2010 | Utsugi et al. .................... 296/70 |
| 2011/0176267 A1* | 7/2011 | Polizzotto et al. ....... 361/679.21 |

FOREIGN PATENT DOCUMENTS

| | | |
|---|---|---|
| EP | 0607585 A1 | 7/1994 |
| FR | 2585823 A1 | 2/1987 |
| FR | 2586625 A1 | 3/1987 |
| FR | 2650988 A1 | 2/1991 |

* cited by examiner

STEPPED INSTRUMENT PANEL FOR AIRCRAFT

CROSS REFERENCE TO RELATED APPLICATIONS

The present invention claims the benefit of French patent application FR 10/03835 filed on Sep. 28, 2010, the disclosure of which is incorporated in its entirety by reference herein.

BACKGROUND OF THE INVENTION (1) Field of the Invention

The general technical field relates to aircraft and in particular rotorcraft or helicopters. More particularly, the invention relates to instrument panels installed in the cockpits of such aircraft.

Even more particularly, the invention relates to an instrument panel for two pilot seats arranged side by side. The dials of such instrument panels are being replaced more and more by multifunction display screens (MFD) that the pilots need to touch regularly. Making such multifunction screens accessible has, thus, become a non-negligible constraint in the design of instrument panels.

(2) Description of Related Art

For example, plane helicopter instrument panels are known that include dials or multifunction screens where crew members are obliged to lean forwards to a greater or lesser extent in order to reach them. Those instrument panels present the drawback of leaving the entire central zone and also the top zone of the instrument panel out of the reach of crew members without them moving or leaning from their seats.

Instrument panels are also known that present two parallel planes with one that extends under an anti-glare shield. Such instrument panels make it easier to reach the dials or screens situated in the top portions of said panels, situated above the cyclic stick. Such instrument panels present the drawbacks of leaving the entire central zone out of the reach of crew members unless they move or lean in their seats.

Instrument panels are also known that present three inclined planes. One of the planes projects from the bottom of the instrument panel and another is situated in the center of said instrument panel. Those instrument panels make it easier to reach dials that are situated at the same height as the pilots' knees. In particular, the inclined central plane makes it easier to reach the central zone of the instrument panel. Such instrument panels nevertheless present the drawback of leaving a zone on either side of the central zone out of reach for crew members, unless they move or lean from their seats.

Certain documents have been taken into consideration, i.e.: U.S. Pat. No. 7,425,891; EP 0 607 585=U.S. Pat. No. 3,946,827; FR 2 586 625; DE 4 005 605; U.S. Pat. No. 7,307,549=US 2007/008188; FR 2 585 823; US 2007/198141; CA 2 380 708; U.S. Pat. No. 3,572,615; FR 2 650 988.

Amongst them, document FR 2 585 823 describes a helicopter cockpit including a remote display unit and a control and processor dashboard unit. That cockpit of a CH47D helicopter of the United States Army shows the locations where typically it is possible to mount the remote display unit and the control and processor dashboard unit. The remote display unit and the control and processor dashboard unit are small enough for it to be possible for them to be installed in the existing space, without modifying the various pieces of equipment used in the cockpit of a helicopter.

Document US 2007/198141 describes an instrument panel for a crew of at least two people. However the two crew positions are very dedicated to certain functions since there is a "driver" and a "commander" with different pieces of equipment to handle. As a result, the figure shows clearly an instrument panel having five flats, two of which are turned strongly towards the crew member concerned. That document does not propose a structure in which each crew member can read at least five screens, while having access to the controls of three of the screens. That document does not provide a so-called "podium" arrangement. However, in a helicopter, the functions are symmetrical: in the event of one crew member being wounded or of one screen failing, the other crew member must be capable of piloting without changing position. In addition, that document does not describe an "offset" on which it is possible to install displays, nor functions that can be switched symmetrically without moving from a respective position.

The above-mentioned drawbacks constitute a genuine problem, in particular in the context of tactical flight missions during which the safety harnesses of crew members are blocked.

SUMMARY OF THE INVENTION

The invention is defined by the claims. It proposes a novel instrument panel making it possible in particular to prevent the crew members from leaning in their seats in order to reach the screens. This new instrument panel presents improvements in particular in terms of compactness and weight. With such an instrument panel all of the dials and/or screens are visibly accessible from each of the piloting positions.

In an embodiment of the invention, the instrument panel for a rotorcraft having two pilot seats side-by-side for two crew members, is arranged under an anti-glare shield and includes display means for displaying information and warnings for use in piloting, at least some of the display means being capable of acting as communications means for communicating with piloting means, said display means comprising a first set of display means disposed on the instrument panel to be accessible to a first crew member, and a second set of display means disposed on the instrument panel to be accessible to a second crew member, some of said display means, referred to as common or shared display means, being accessible to both crew members, wherein the instrument panel includes, symmetrically about a longitudinal mid-axis of the rotorcraft, a central dashboard including the common display means, at least two side dashboards disposed on either side of the central dashboard and including display means accessible to the respective crew member, said dashboards being substantially parallel to each other and presenting a longitudinal forward offset from one dashboard to a following dashboard on going from the central dashboard towards each of the sides, said offset being less than a predefined value.

In an embodiment, the instrument panel in accordance with the invention is constituted by a rigid, single-piece frame of shape that defines the dashboards constituting supports for mounting and fastening the display means.

In an embodiment of the instrument panel in accordance with the invention, the display means of at least some of the dashboards comprise a multifunction display screen MFD.

In an embodiment of the instrument panel in accordance with the invention, the display means of all of the dashboards comprise a multifunction display screen MFD.

In an embodiment of the instrument panel in accordance with the invention, the multifunction display screen(s) MFD is/are pivotally mounted on the dashboards via one or two pivots.

In an embodiment of the instrument panel in accordance with the invention, the longitudinal offset between the central panel and the outermost lateral panels is equal to 60 millimeters (mm). This offset depends on the position of the pilot relative to the panel, which itself depends on the position of the cyclic stick. This value may be increased, e.g. when screens are pivotally mounted.

In an embodiment of the instrument panel in accordance with the invention, the longitudinal offset between two adjacent dashboards is identical for the entire instrument panel.

In another embodiment, the offset is greater between the central dashboard and the middle dashboard than it is between the middle dashboards and the lateral dashboards.

In an embodiment of the instrument panel in accordance with the invention, at least some of the dashboards include additional functional members.

In an embodiment of the instrument panel in accordance with the invention, the dashboards extend substantially orthogonally relative to the longitudinal axis of the rotorcraft.

In an embodiment of the instrument panel in accordance with the invention, the dashboards extend in planes that are inclined at an angle lying in the range 45° to 90° relative to the longitudinal axis of the rotorcraft.

In an embodiment of the instrument panel in accordance with the invention, the shield overlying the display means presents on at least one side a hosing for parameter-setting cards, which housing is accessible from above and that is formed in the thickness of said shield.

In an embodiment, the invention provides a rotorcraft of the helicopter kind including an instrument panel as described above.

The instrument panel in accordance with the invention presents the advantage that the functions displayed and dedicated to one crew member can be reached by said crew member without changing position. This also applies to functions that are common to both crew members, which are displayed on the central portion of the instrument panel.

Another advantage of the instrument panel in accordance with the invention lies in greater compactness. This is obtained by trimming the instrument panel as closely as possible to the display screen. This provides improved outside visibility, in particular in the critical visibility zone of the stereogram, i.e. ±15° in heading angle and ±20° in azimuth. Increased visibility is also obtained by trimming the panel in the pilot's line of sight, while not changing the room available for said pilot's knees.

The instrument panel in accordance with the invention, in the form of a podium or steps, also serves to release space behind it. This space may be used for housing environmental control system ECS type equipment or other equipment for heating or air conditioning the cockpit, a unit for demisting the windshield, a windscreen wiper motor and a fluid tank, an avionics control unit, a radar, etc.

The instrument panel in accordance with the invention advantageously includes multifunction display screens MFD that may be programmed as a function of the mission requirements of a rotorcraft or a helicopter. The front area of the display panel is reduced since there is no longer any need to reserve spaces in the display panel that would otherwise be used for installing dials that are specific to certain missions. This likewise achieves a saving in weight for the instrument panel.

Another advantage of the instrument panel in accordance with the invention lies in visual access to all of the screens of said instrument panel from each of the piloting positions. This visual access to the screens dedicated to the other pilot is available, e.g. without it being necessary for a pilot to lean over.

The instrument panel in accordance with the invention makes it possible to obtain an increase in windshield area, and consequently an increase in visibility, and also a greater area for projecting flight information optronically on the inside of said windshield.

The instrument panel in accordance with the invention, having a stepped shape, is also well adapted to the movements applied to flight controls, e.g. control sticks or mini-control sticks, while allowing the pilot to reach all of the portion of the instrument panel that is dedicated to said pilot and also the portion that is common to both pilots, without needing to lean over.

The podium shape is defined by the existence of longitudinal webs providing the offset towards the front of the aircraft of the lateral dashboards relative to the central dashboard. These webs naturally contribute to providing the instrument panel as a whole with stiffness.

In the central dashboard, the longitudinal webs are wide enough to engage directly with the control panel (i.e. without additional parts). The dashboards of the instrument panel define the steps in a podium shape with the apex being the central dashboard and the lateral dashboards being offset from the central dashboard towards the front of the aircraft.

In addition, the specific podium shape ensures inertness relative to the fitting of the instrument panel. It is fitted in its central portion on the control panel and this is done specifically where the instrument panel has its greatest thickness. This obtains a reduction of the vibration induced by the bending associated with the weight of the MFD screens, which weigh about 10 kilograms (kg) each.

BRIEF DESCRIPTION OF THE DRAWINGS

The invention and its advantages appear in greater detail from the following description of embodiments given by way of non-limiting illustration with reference to the accompanying figures, in which.

Elements that are structurally and functionally identical and present in more than one of the Figures are given the same numerical or alphanumerical references in each of them.

DETAILED DESCRIPTION OF THE PREFERRED EMBODIMENT

Figure 1:
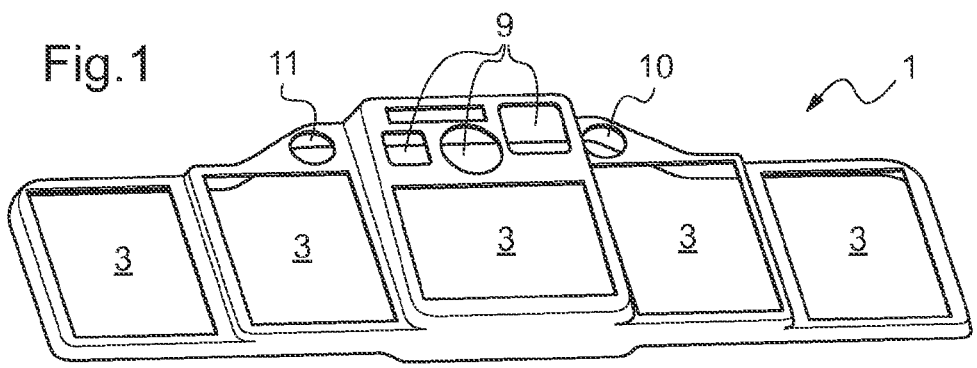
FIG. 1 is a perspective view of an embodiment of an instrument panel in accordance with the invention before mounting in a rotorcraft and not including display means.

FIG. 1 is a perspective view of an embodiment of an instrument panel in accordance with the invention prior to being mounted in a rotorcraft and not including display means 2 of the multifunction display screen (MFD) type.

The instrument panel comprises a frame 1 having locations provided therein in the form of adjacent dashboards 3 defining the positions for front faces 2a of display means 2 when the display means are mounted in the instrument panel. These empty dashboards 3 define more precisely openings provided in the frame 1 for receiving the display means 2. The front faces 2a may be mutually parallel, for example.

Figure 2:
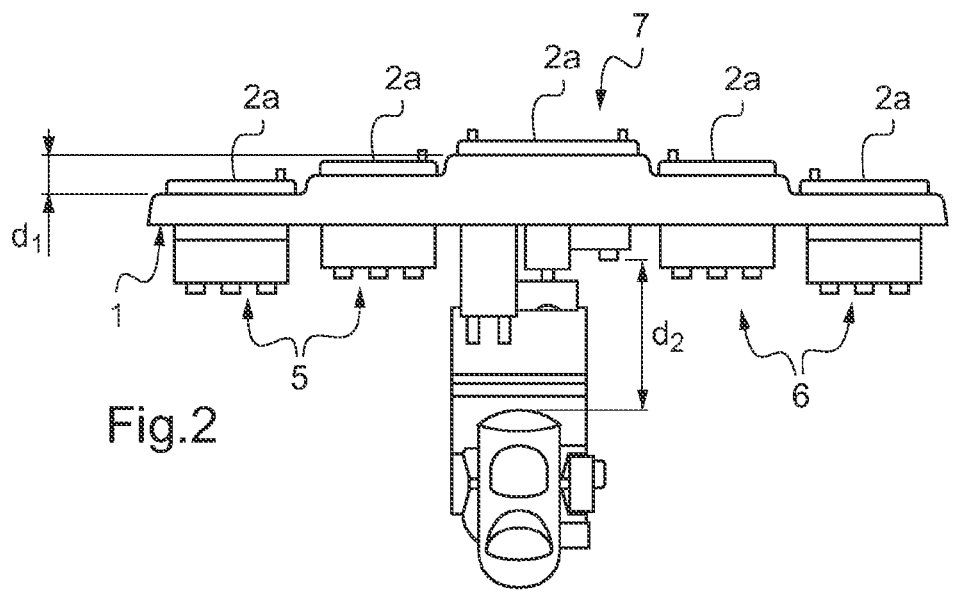
FIG. 2 is a diagrammatic view from above of an instrument panel in accordance with the invention including the display means.
Figure 3:
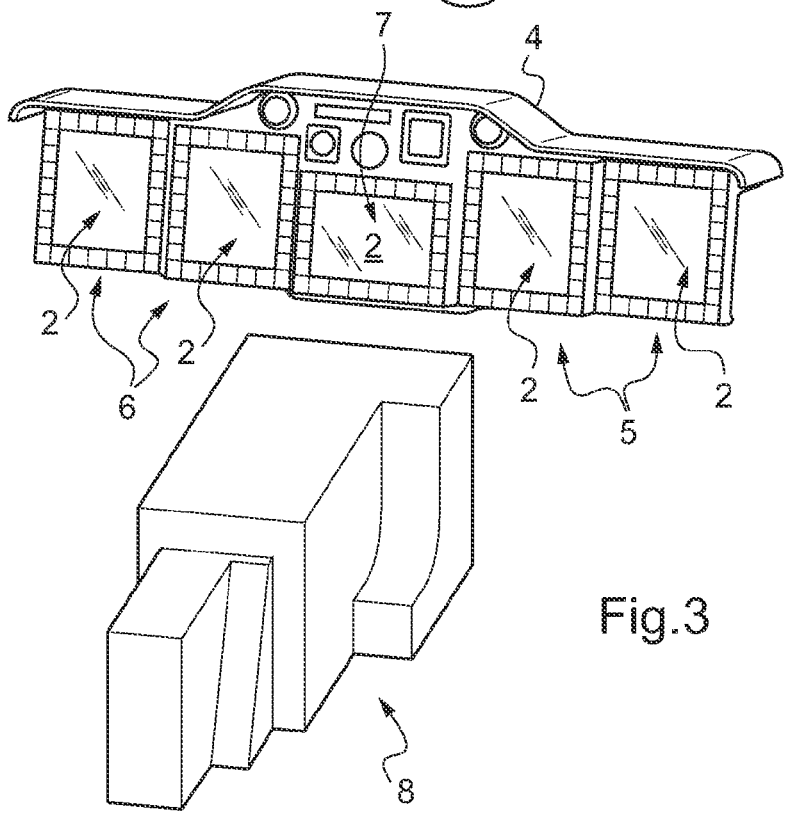
FIG. 3 is a view of an instrument panel in accordance with the invention including display means of the multifunction display screen type.

FIG. 2 is thus a diagrammatic plan view of an instrument panel in accordance with the invention, including its display means, and FIG. 3 is a view of the instrument panel in accordance with the invention including display means of the multifunction display screen (MFD) kind.

The instrument panel is designed to be arranged under an anti-glare shield 4 and it includes means 2 for displaying information and warnings that are useful for piloting. At least some of the display means 2 may be used as means for communicating with piloting means.

The display means 2 comprise a first set 5 of display means 2 arranged on the instrument panel to be accessible to a first crew member, and a second set 6 of display means 2 arranged on the instrument panel to be accessible to a second crew member. Some of said display means 2, referred to as common or shared display means 7 are accessible to both crew members.

FIG. 3 is a highly diagrammatic view showing the position of the instrument panel in accordance with the invention relative to a central console 8 of the cockpit.

The instrument panel in accordance with the invention includes various dashboards disposed laterally on either side of a longitudinal mid-axis of the panel. In certain embodiments, these dashboards are disposed substantially symmetrically about the longitudinal mid-axis of the panel, which itself sometimes coincides with the longitudinal mid-axis of the rotorcraft, a central dashboard 3 including the common display means 7, and at least at two lateral dashboards 3 being arranged on either side of the central dashboard 3 and including the display means 2 that are accessible to respective crew members.

The dashboards 3 are substantially parallel to one another and they present a forward longitudinal offset from one dashboard 3 to the next starting from the central dashboard 3, and going towards each of the sides. The longitudinal offset of successive dashboards 3 and consequently of the front faces 2a is less than some predefined maximum limit, e.g. equal to 30 mm.

There is no predefined value putting a limit on the longitudinal offset since it is inherent to the position of the pilot which may vary considerably depending on the size of the cockpit, on the position of the cyclic stick or mini-stick, and whether screens are mounted on pivots.

Advantageously, the longitudinal offset between two adjacent dashboards 3 is not identical over the entire instrument panel. The offset is greater between the central dashboard and the middle dashboards than it is between the middle dashboards and side dashboards.

The space saving obtained behind the frame 1 and the common display means 7 serves to release space of depth d2 that is suitable for housing a system of the ECS type.

The maximum longitudinal offset d1 between the central dashboard 3 and the outside dashboards 3 is for example preferably equal to 60 mm. This value may be increased, e.g. when screens are pivotally mounted.

Figure 4:
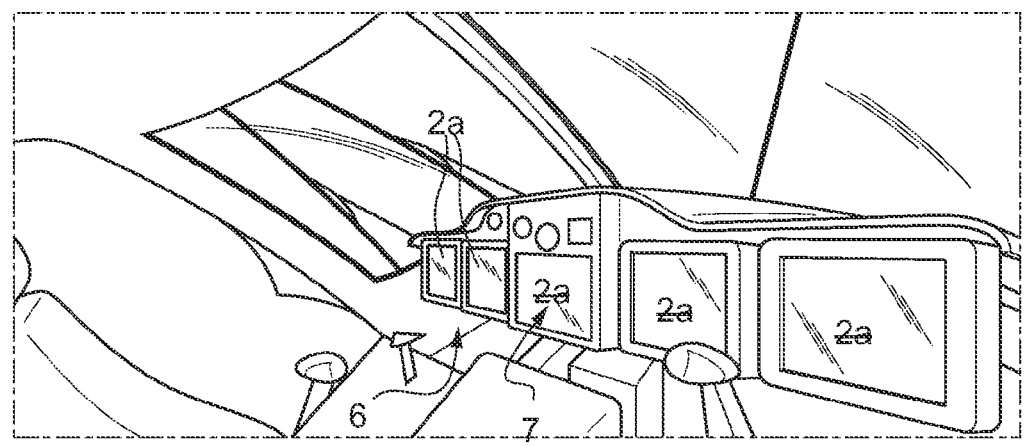
FIG. 4 is a view showing an instrument panel in accordance with the invention arranged in a rotorcraft cockpit.

In FIGS. 3 and 4, it can be understood that the specific function of each piloting position is different from that of the other position, such that each position may present a configuration that differs from that of the other position. Thus, the frame 1 and the panel are not symmetrical in all embodiments of the invention, but merely lie on opposite sides of the longitudinal mid-axis of the panel. In certain embodiments of the invention, the longitudinal mid-axis of the panel may be offset laterally relative to the longitudinal mid-axis of the aircraft.

In an embodiment, the instrument panel in accordance with the invention is constituted by a rigid frame 1, made as a single piece and of shape that defines the dashboards 3 that constitutes means for mounting and fastening the display means 2.

By way of example, the instrument panel may be made of a metal or of a reinforced composite material, such as molded titanium or aluminum or including fibers of carbon, glass, or Kevlar (registered trademark).

In an embodiment of the instrument panel in accordance with the invention, the display means 2 of at least some of the dashboards 3 include respective multifunction display screens MFD.

By way of example, the display means 2 in all of the dashboards 3 comprise at least one multifunction display screen MFD.

In an embodiment of the instrument panel in accordance with the invention, the multifunction display screen(s) MFD is/are pivotally mounted on the dashboards via one or two pivots. This kind of mounting is itself known.

In an embodiment of the instrument panel in accordance with the invention, at least some of the dashboards 3 incorporate additional functional members 9, 10, 11.

For example, the dashboards 3 extend in extension planes that are inclined at an angle lying in the range 45° to 90° relative to the longitudinal axis of the rotorcraft.

In a particular embodiment of the instrument panel in accordance with the invention, the dashboards 3 extend substantially orthogonally relative to the longitudinal axis of the rotorcraft and the cockpit.

FIG. 4 shows an example of an instrument panel in accordance with the invention arranged in a rotorcraft cockpit.

Figure 5B:
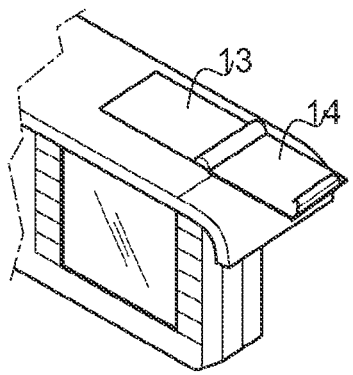
FIG. 5b shows the storage of FIG. 5a in the open position.
Figure 5A:
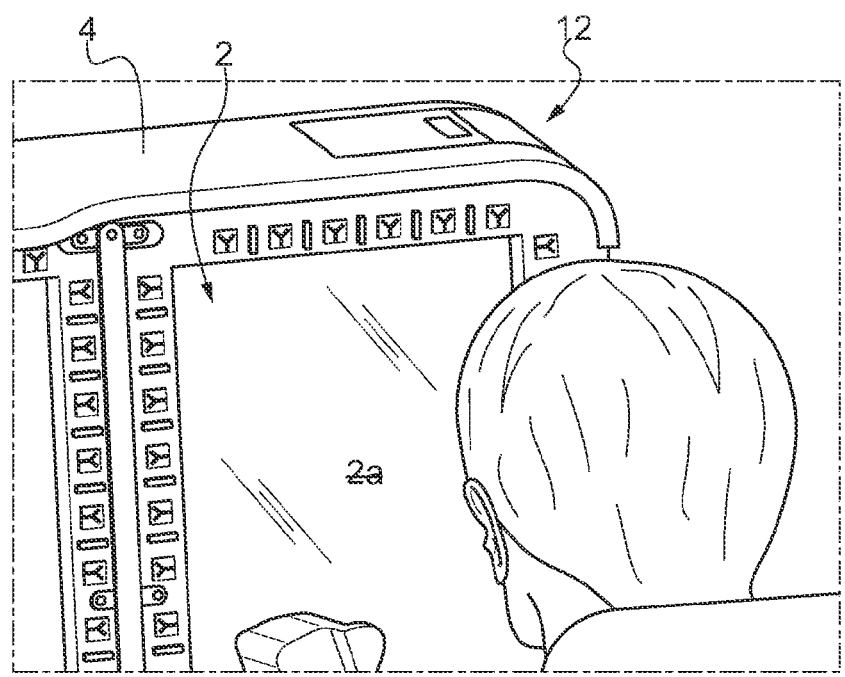
FIG. 5a shows the side end of an instrument panel in accordance with the invention including storage for parameter-setting cards.

In an embodiment of the instrument panel in accordance with the invention, as shown in FIGS. 5a and 5b, the shield 4 projecting over the display means 2 includes, on at least one side, storage 12 for parameter-setting cards that can be accessed from above and that are arranged in the thickness of said shield 4. The storage 12 comprises a housing 13 and a cover 14 suitable for closing said housing 13.

By way of example, the MFD screens are screw-fastened or clip-fastened so as to ensure that they are interchangeable.

Naturally, the invention may be subjected to numerous variations as to its implementation. The embodiments described cannot identify all possible embodiments.

What is claimed is:

1. An instrument panel for a rotorcraft having two pilot seats side by side, one forming a first piloting position and the other forming a second piloting position, said instrument panel including at least three multifunction display screens, including a first multifunction display screen for the first piloting position, a second multifunction display screen for the second piloting position, and a common multifunction display screen between the first and second multifunction display screens, the instrument panel having a bottom portion, a top portion, and a central axis extending from the bottom portion to the top portion, wherein the instrument panel possesses a rigid, one-piece frame, the frame comprising, transversely on either side of the central axis, a central dashboard including the common multifunction display screen, at least two lateral dashboards disposed on either side of the central dashboard, the central and lateral dashboards being substantially symmetrically arranged relative to the central axis of the instrument panel, said central dashboard being in one piece with the at least two lateral dashboards and being separated from the lateral dashboards by longitudinal sidewalls, one longitudinal sidewall extending from the lateral dashboard including the first multifunction display screen and towards the first piloting position; another longitudinal sidewall extending from the lateral dashboard including the second multifunction display screen and toward the second piloting position, said central and lateral dashboards being substantially mutually parallel and presenting a longitudinal offset in a forward direction from said central dashboard relative to each lateral dashboard, said offset having a predefined value of at least 30 mm and being identical between adjacent dashboards across the instrument panel.

2. An instrument panel according to claim 1, wherein at least one multifunction display screen is pivotally mounted to the dashboards using one or two pivots.

3. An instrument panel according to claim 1, wherein the longitudinal offset value between the central dashboard and the outermost lateral dashboard is equal to 60 mm.

4. An instrument panel according to claim 1, wherein at least one of the dashboards incorporates additional functional members.

5. An instrument panel according to claim 1, wherein at least one of the lateral dashboards extend substantially orthogonally relative to the central axis of the instrument panel.

6. An instrument panel according to claim 1, wherein at least one of the lateral dashboards extend in a plane that is inclined at an angle lying in a range between 45° and 90° relative to the central axis.

7. An instrument panel according to claim 1, wherein the instrument panel includes an anti-glare shield fastened above the multifunction display screen and over at least one side of the multifunction display screen, said instrument panel including a housing on top.

8. A rotorcraft such as a helicopter including an instrument panel in accordance with claim 1.

9. A rotorcraft according to claim 8, wherein the rotorcraft includes an anti-glare shield, the shield being fastened to the instrument panel above and on the sides of the instrument panel.

10. A rotorcraft according to claim 9, wherein said instrument panel provides a housing in its thickness and on top, and said shield includes a cover for closing said housing.

11. An instrument panel according to claim 1, wherein the at least three multifunction display screens comprises five multifunction display screens and the at least two lateral dashboards comprises four lateral dashboards.

12. A rotorcraft instrument panel comprising:
a first dashboard having a first multifunction display facing in a first direction and extending in a first plane, the first dashboard having a central axis extending from a top portion of the first dashboard to a bottom portion of the first dashboard;
a second dashboard proximate the first dashboard on a first side of the central axis and a third dashboard proximate the first dashboard on a second side of the central axis, the second dashboard having a second multifunction display facing in the first direction and the third dashboard having a third multifunction display facing in the first direction, the second and third dashboards being coplanar with each other and extending in a second plane spaced a first distance from the first plane in a second direction opposite the first direction;
a fourth dashboard on the first side of the central axis proximate the second dashboard and a fifth dashboard on the second side of the central axis proximate the third dashboard, the fourth dashboard having a fourth multifunction display facing in the first direction and the fifth dashboard having a fifth multifunction display facing in the first direction, the fourth and fifth dashboards being coplanar with each other and extending in a third plane spaced a second distance from the first plane in the second direction, the second distance being greater than the first distance; and
a common sidewall having a first portion extending along the first side of the central axis and a second portion extending along the second side of the central axis, the first portion extending from a periphery of the first dashboard in the second direction to connect to a periphery of the second dashboard and extending from the periphery of the second dashboard in the second direction to connect to a periphery of the fourth dashboard and the second portion extending from the periphery of the first dashboard in the second direction to connect to a periphery of the third dashboard and extending from the periphery of the third dashboard in the second direction to connect to a periphery of the fifth dashboard, wherein the first, second, third, fourth, and fifth dashboards and the common sidewall are an integral unit and the first, second, third, fourth, and fifth dashboards are symmetrically arranged relative to the central axis.

13. The rotorcraft instrument panel of claim 12, wherein the second distance is 60 mm.

14. The rotorcraft instrument panel of claim 12, wherein the first distance is 50% of the second distance.

15. The rotorcraft instrument panel of claim 12, wherein the common sidewall extends a first length from the periphery of the first dashboard in the second direction, a second length from the periphery of the second dashboard in the second direction, a third length from the periphery of the third dashboard in the second direction, a fourth length from the periphery of the fourth dashboard in the second direction, and a fifth length from the periphery of the fifth dashboard in the second direction, the first length being greater than the second length and greater than the third length, the second length being greater than the fourth length, and the third length being greater than the fifth length.

16. A rotorcraft comprising:
first and second pilot seats in a side by side configuration; and
a display panel comprising an integral frame defining first, second, third, fourth, and fifth dashboards, the first dashboard being positioned between the second and third dashboards and having a first display facing a first direction and extending in a first plane, the second dashboard having a second display facing the first pilot seat and extending in a second plane, and the third dashboard having a third display facing the second pilot seat and extending in a third plane, the second and third planes defining a first angle relative to the first plane; the first, second, and third dashboards being positioned between the fourth and fifth dashboards, the fourth dashboard having a fourth display facing the first pilot seat and extending in a fourth plane, the fifth dashboard having a fifth display facing the second pilot seat and extending in a fifth plane, the fourth and fifth planes defining a second angle relative to the first plane, the integral frame further including a first common sidewall portion extending at least 30 mm from a periphery of the fourth dashboard in the first direction to connect to a periphery of the second dashboard and extending at least 30 mm from the periphery of the second dashboard in the first direction to connect to a periphery of the first dashboard, and a second common sidewall portion extending at least 30 mm from a periphery of the fifth dashboard in the first direction to connect to a periphery of the third dashboard and extending at least 30 mm from the periphery of the third dashboard in the first direction to connect to the periphery of the first dashboard.

17. The rotorcraft of claim 16, wherein at least one of the displays is pivotally mounted to the display panel.

18. The rotorcraft of claim 16, further comprising an antiglare shield fastened to the display panel, the display panel including a housing and the antiglare shield including a cover for closing a top side of the housing.

* * * * *